(12) United States Patent
Pritchard et al.

(10) Patent No.: US 10,066,743 B2
(45) Date of Patent: Sep. 4, 2018

(54) MOTOR DRIVEN TRANSFER CASE WITH MODULAR ACTUATION

(71) Applicant: BorgWarner Inc., Auburn Hills, MI (US)

(72) Inventors: Larry A. Pritchard, Macomb, MI (US); David E. Young, Royal Oak, MI (US); Joseph Mastie, Belleville, MI (US); Donn Niffenegger, Warren, MI (US); Christopher Kurmaniak, Clarkston, MI (US)

(73) Assignee: BorgWarner Inc., Auburn Hills, MI (US)

( * ) Notice: Subject to any disclaimer, the term of this patent is extended or adjusted under 35 U.S.C. 154(b) by 301 days.

(21) Appl. No.: 14/935,505

(22) Filed: Nov. 9, 2015

(65) Prior Publication Data
US 2016/0131253 A1 May 12, 2016

Related U.S. Application Data

(60) Provisional application No. 62/077,957, filed on Nov. 11, 2014.

(51) Int. Cl.
| | |
|---|---|
| *F16H 37/06* | (2006.01) |
| *F16H 61/32* | (2006.01) |
| *F16H 63/32* | (2006.01) |
| *F16H 63/30* | (2006.01) |
| *F16H 59/08* | (2006.01) |
| *B60K 17/344* | (2006.01) |

(Continued)

(52) U.S. Cl.
CPC ............ *F16H 61/32* (2013.01); *F16H 59/08* (2013.01); *F16H 63/304* (2013.01); *F16H 63/32* (2013.01); *B60K 17/344* (2013.01); *B60K 2023/0858* (2013.01); *F16H 2061/2869* (2013.01); *F16H 2061/326* (2013.01); *F16H 2063/3056* (2013.01)

(58) Field of Classification Search
None
See application file for complete search history.

(56) References Cited

U.S. PATENT DOCUMENTS

| | | |
|---|---|---|
| 5,699,870 A | 12/1997 | Warren |
| 6,779,641 B2 | 8/2004 | Vonnegut et al. |
| 6,780,134 B2 | 8/2004 | Vonnegut et al. |

(Continued)

*Primary Examiner* — Ha Dinh Ho
(74) *Attorney, Agent, or Firm* — Young Basile Hanlon & MacFarlane, P.C.

(57) ABSTRACT

A transfer case (30) and a method of assembly in an all-wheel drive vehicle can include a range shifting assembly (60) for shifting between a low-range and high-range drive mode, a normally disengaged clutch assembly (80) for transferring drive torque to a first and second driveline, a clutch actuator (88), and an actuating gear (48). The clutch actuator (88) can be moveable between an expanded position and a contracted position and engageable with the clutch assembly (80) for engaging the clutch assembly (80) when in the expanded position. The actuating gear (48) can be reversibly rotatable through a predetermined angular arc of movement for operating the clutch actuator (88) between the contracted and expanded position for actuating the clutch assembly (80) and for shifting the range shifting assembly (60) between a low-range drive mode and a high-range mode when the clutch assembly (80) is in the disengaged position.

15 Claims, 6 Drawing Sheets

(51) Int. Cl.
  *F16H 61/28* (2006.01)
  *B60K 23/08* (2006.01)

(56) References Cited

U.S. PATENT DOCUMENTS

| | | |
|---|---|---|
| 6,808,053 B2 | 10/2004 | Kirkwood et al. |
| 6,814,682 B2 | 11/2004 | Spitale |
| 6,905,436 B2 * | 6/2005 | Mueller .............. B60K 17/3467 192/84.6 |
| 6,945,375 B2 | 9/2005 | Kirkwood et al. |
| 7,111,716 B2 * | 9/2006 | Ekonen .............. B60K 23/0808 180/249 |
| 7,125,364 B2 * | 10/2006 | Cring ................ B60K 23/0808 477/174 |
| 7,540,820 B2 * | 6/2009 | Mizon ................ B60K 17/3467 180/249 |
| 7,650,808 B2 | 1/2010 | Mizon et al. |
| 8,821,334 B2 * | 9/2014 | Mueller ................ B60K 17/35 475/198 |
| 2003/0211913 A1 | 11/2003 | Spitale |
| 2003/0224894 A1 | 12/2003 | Vonnegut et al. |
| 2008/0129230 A1 | 6/2008 | Schepperle et al. |

\* cited by examiner

MOTOR DRIVEN TRANSFER CASE WITH MODULAR ACTUATION

CROSS-REFERENCE TO RELATED APPLICATIONS

This application claims the benefit of U.S. Patent Application No. 62/077,957 filed on Nov. 11, 2014, the disclosure of which is herein incorporated by reference in its entirety.

FIELD OF THE INVENTION

The invention relates to a mechanism for joint control of transmission and clutch or brake, and in particular, a power-transmitting device using friction or interlocking parts for securing and releasing driving continuity as between two shafts or a pulley and a shaft or other driving and driven parts including an actuating device that causes the power-transmitting device to transition into or out of a state in which the power-transmitting device provides driving continuity between the driving and driven parts.

BACKGROUND

Transfer cases are used in vehicular driveline applications for selectively directing drive torque from the powertrain to wheels of the vehicle, either four wheel drive or two wheel drive. Transfer cases have been previously disclosed in U.S. Pat. No. 7,650,808; U.S. Pat. No. 6,945,375; U.S. Pat. No. 6,814,682; U.S. Pat. No. 6,808,053; U.S. Pat. No. 6,780,134; U.S. Pat. No. 6,779,641; U.S. Pat. No. 5,699,870; U.S. Published Application No. 2003/0211913; U.S. Published Application No. 2003/0224894; and U.S. Published Application No. 2008/0129230. Current transfer cases are equipped with a mode shift mechanism that can be actuated to shift between different drive modes. The transfer cases can include a range shift mechanism which can be selectively actuated by a vehicle driver to engage a reduction gearset for shifting between high-range and low-range drive modes. In the current transfer cases, the range shift mechanism and clutch assembly are independently controlled by separate power-operated actuators. Some current transfer cases include a single power-operated actuator operable to coordinate the actuation of both the range shift mechanism and the clutch assembly. While transfer cases equipped with coordinated actuation systems have been commercially successful, a need exists to develop alternative actuation systems that are more energy efficient and more economically feasible to produce. Some manufacturers use a single motor to perform both functions, while relying on a plethora of additional off axis components to accomplish this task. Specifically, worm gear drives, cams, barrel cams, gear reduction, shift shafts, range forks etc. are used to evoke actuating of both the clutch and range shifting assemblies, resulting in a complex transfer case.

SUMMARY

To overcome the limitation of current technology, a motor driven transfer case with modular actuation uses a simplified actuating device to actuate both the range shifting assembly and a clutch assembly located adjacent to one another along a primary axis. The disclosed transfer case uses an off-axis electric motor to perform both clutch actuating and range shifting functions. The disclosed transfer case uses a simplified off axis gear train to rotate an actuating gear which is mounted concentric to the clutch and range actuating axis.

The range function is performed by a barrel cam rotatable by the actuating gear. A shift fork can travel axially in response to interaction with a rotatable cam surface of the barrel cam for shifting between a low-range drive mode and a high-range drive mode. At both ends of the cam surface, a circumferentially extending cam surface portion defines a period of dwell in which the range shifting assembly is maintained in one of the low-range and high-range drive mode while the clutch is operated between an engaged position and a disengaged position. When the shift fork is traveling within one of the periods of dwell, a clutch actuating cam can be rotated in response to rotation of the actuating gear to axially move the clutch toward an engaged position to engage the clutch. When the shift fork begins to travel between the periods of dwell for shifting the mode of operation between the low-range drive mode and high-range drive mode of operation, actuating gear can be reversibly rotated and a clutch return spring can axially contract the clutch actuating cam to disengage the clutch assembly. When the shift fork reaches the opposite end of the cam surface and enters into the other one of the periods of dwell, the clutch actuating cam can be rotated in response to rotation of the actuating gear to axially move the clutch toward an engaged position to re-engage the clutch. The disclosed transfer case is an improvement over current products in that the actuating gear is partially rotated for higher efficiency and the transfer case uses fewer components to affect the same actuating function as provided in current transfer cases.

A transfer case of a motor vehicle can include an input shaft having a primary axis of rotation, a first output shaft, a second output shaft, and a power transmission device located between the first output shaft and the second output shaft. The transfer case can include a range shift assembly connected between the input shaft and the first output shaft to shift between a low-range drive mode and a high-range drive mode of operation and a normally disengaged clutch assembly connected to the power transmission and moveable between an engaged position and a disengaged position to transfer into and out of a state creating driving continuity for transferring drive torque between the first output shaft and the second output shaft. The transfer case can include a clutch actuator moveable between a contracted position and an expandable position and engageable with the clutch assembly for engaging the clutch assembly when in the expanded position and an actuating gear reversibly rotatable through a predetermined angular arc of movement for operating the clutch actuator between the contracted position and the expanded position for actuating the clutch assembly between the engaged position and the disengaged position. The reversibly rotatable actuating gear can also shift the range shifting assembly between the low-range drive mode and the high-range drive mode when the clutch assembly is in the disengaged position.

A transfer case can include an input shaft having a primary axis of rotation, a first output shaft aligned coaxially with respect to the input shaft and rotatable about the primary axis, a second output shaft rotatable about a secondary axis parallel to the primary axis, a range shifting assembly located coaxial with respect to the primary axis, a clutch assembly located coaxial and axially adjacent the range shifting assembly, an actuating gear mounted coaxial with respect to the primary axis and axially interposed between the range shifting assembly and the clutch assembly, a clutch actuating cam rotatable in response to rotation of the actuating gear, and a reversible electric motor located off axis with respect to the primary axis for driving the actuating gear in rotation. The range shifting assembly can be operably connected between the input shaft and the first output shaft and can axially shift between the low-range drive mode and the high-range drive mode. The range shifting assembly can include an internal range sleeve operably driven in axial movement along the first output shaft between a first axial position and a second axial position. The range shifting assembly can include a differential assembly operably engageable with the internal range for providing different drive ratios between the input shaft and the output shafts. The differential assembly can include a planetary gear assembly having a plurality of planetary gears supported by a planetary gear carrier for meshing engagement between a ring gear and a sun gear driven by the input shaft. The first output shaft can be selectively driven by one of the planetary gear carrier and the sun gear depending on an axial position of the internal range sleeve in response to actuation of the range shifting assembly. The clutch assembly can be operably connected to the power transmission device to axially move between a disengaged position and an engaged position to transfer into and out of a state creating driving continuity for transferring drive torque between the first output shaft and the second output shaft. The actuating gear can be rotatable through at least a predetermined angular arc with respect to the primary axis for actuating the clutch assembly and for shifting the range shifting assembly between the low-range drive mode and the high-range mode when the clutch assembly is in the disengaged position. The clutch assembly can be actuated prior to and after shifting the range shifting assembly between the low-range and high-range drive mode. The clutch actuating cam can be axially moveable towards the clutch assembly for engaging the clutch assembly.

A method for assembling a transfer case can be provided, where the transfer case can be connected to an input shaft having a primary axis of rotation, a first output shaft, a second output shaft, and a power transmission device located between the first output shaft and the second output shaft. The method can include providing a range shifting assembly to be connected to the input shaft, positioning a clutch actuator cam coaxial to and axially adjacent to the range shifting assembly, connecting an actuating gear interposed axially between the range shifting assembly and the clutch actuator for reversible rotation for driving the clutch actuating cam in rotation in response to rotation of the actuating gear. The range shifting assembly can be connected between the input shaft and the first output shaft to axially shift between a low-range drive mode and a high-range drive mode. A clutch assembly can be connected to the power transmission device to axially move between the engaged position and a disengaged position to transfer into and out of a state creating driving continuity for transferring drive torque between the first output shaft and the second output shaft. The actuating gear can be rotated to shift the range shifting assembly between the low-range drive mode and the high-range mode, and to actuate the clutch actuating cam between an expanded position and a contracted position to drive the clutch assembly between an engaged position and a disengaged position. The clutch assembly can be actuatable prior to and after shifting the range shifting assembly between the low-range drive mode and the high-range drive mode of operation. The clutch actuating cam can be axially moveable toward the clutch assembly for engaging the clutch assembly.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
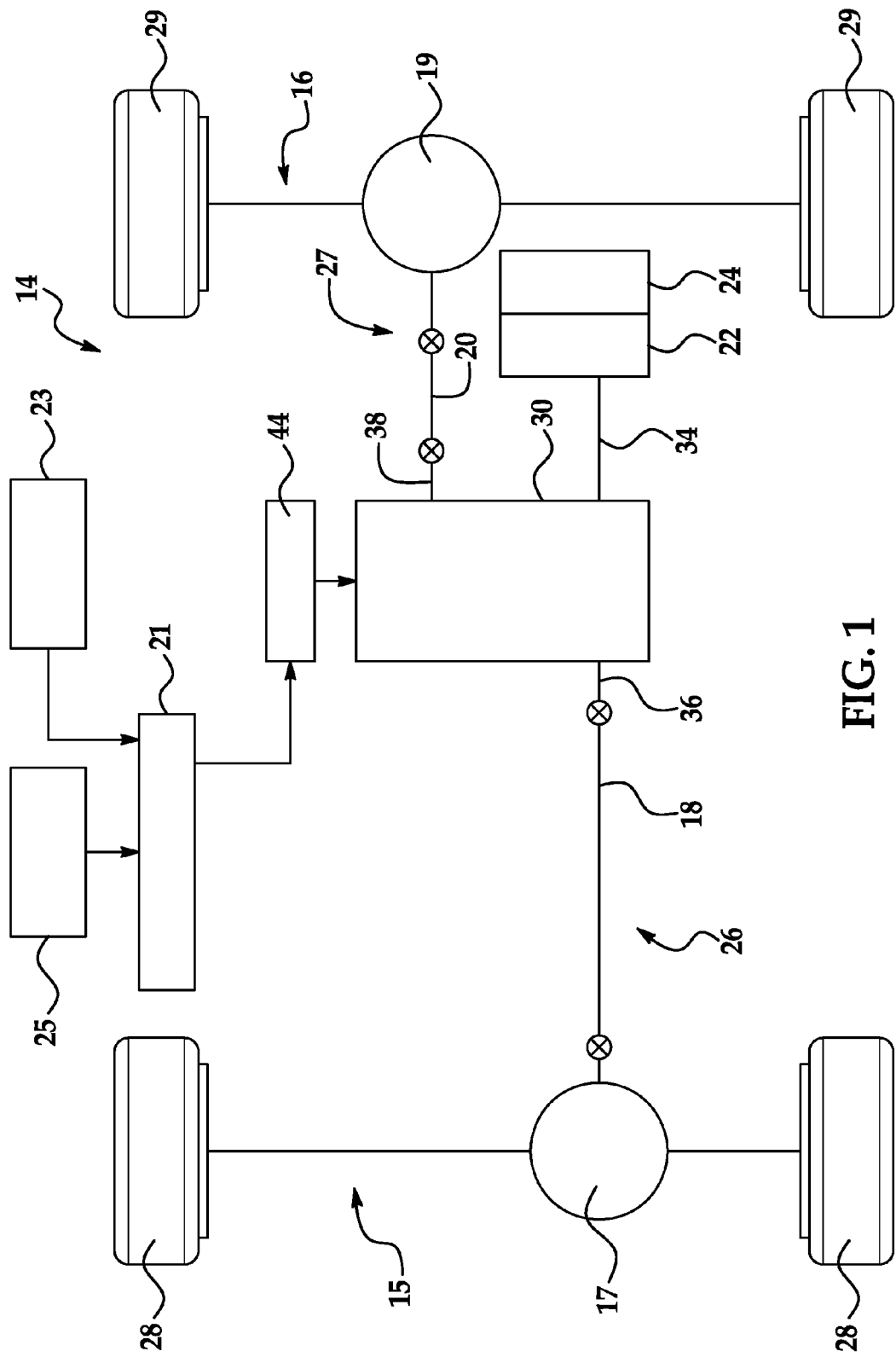
FIG. 1 is a schematic view of a four-wheel drive vehicle equipped with a motor driven transfer case with modular actuation.

Referring now to FIG. 1, a vehicle 14 can include an internal combustion engine 24 and power transmission device 22 for generating and delivering drive torque to a front driveline 26 and a rear driveline 27. The vehicle 14 can further include a transfer case 30 for transmitting drive torque from the internal combustion engine 24 and the power transmission device 22 to the front driveline 26 and the rear driveline 27. The front driveline 26 can include a pair of front wheels 28 connected at distally opposite ends of a front axle assembly 15 including a front differential 17 that can be coupled to one end of a front driveshaft 18. The opposite end of the front driveshaft 18 can be coupled to a first output shaft 36 of the transfer case 30. The first output shaft 36 can drive the front driveshaft 18, and the front differential 17 can transfer the drive energy to the pair of front wheels 28 through the front axle assembly 15. The rear driveline 27 can include a pair of rear wheels 29 connected at distally opposite ends of a rear axle assembly 16 including a rear differential 19 that can be coupled to one end of a rear driveshaft 20. The opposite end of the rear driveshaft 20 can be coupled to a second output shaft 38 of the transfer case 30. The transfer case 30 can provide output power to the second output shaft 38 which provides rotational energy to the rear driveshaft 20. This rotational energy can be transferred through the rear differential 19 and the rear axle assembly 16 to the pair of rear wheels 29. The transfer case 30 can be operated through a reversible electric motor 44 controlled in accordance with a control program stored in memory within an electronic control unit (ECU) 21 in response to signals received from one or more vehicle sensors 23 and/or a mode select mechanism 25.

Figure 2:
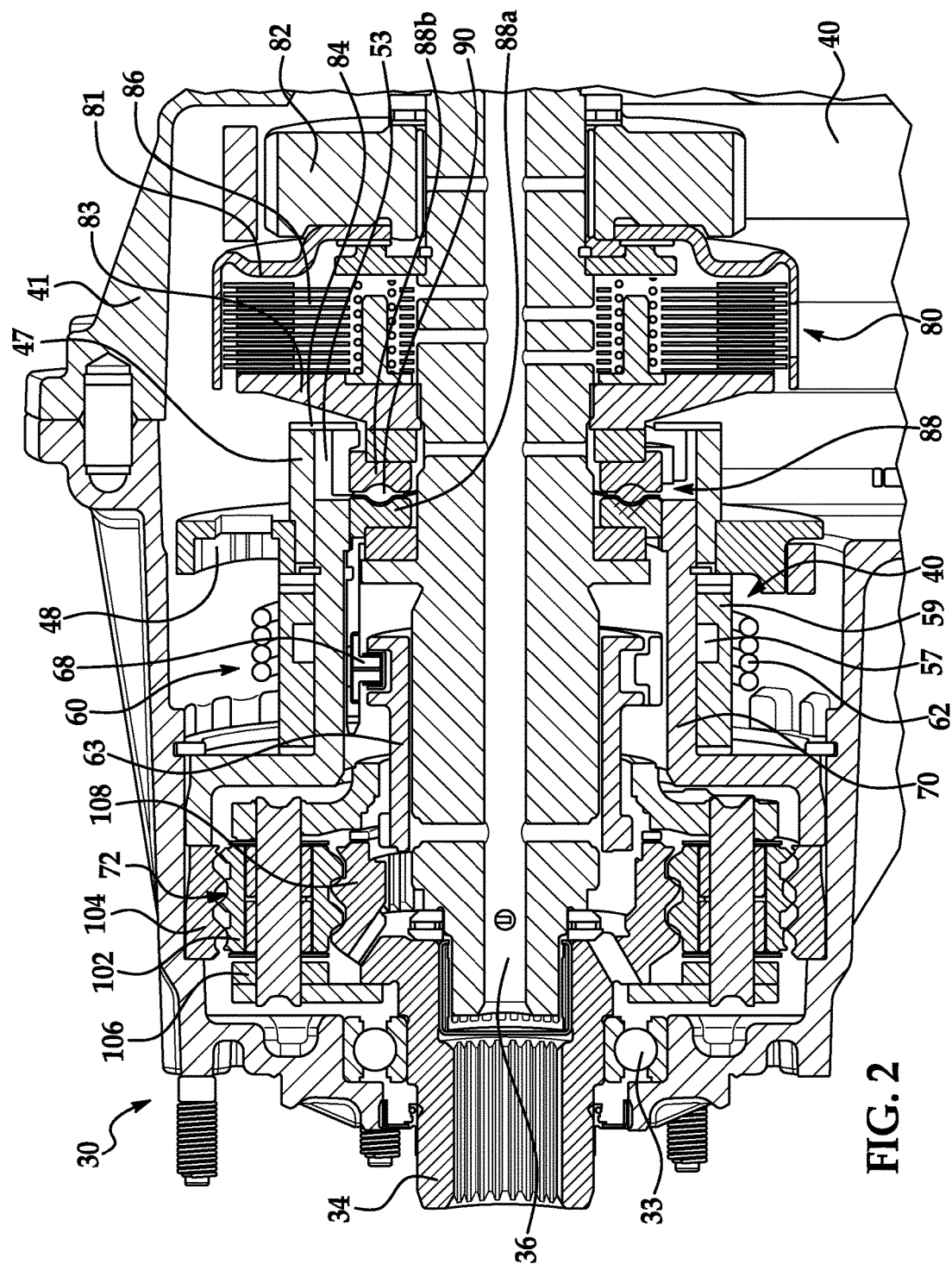
FIG. 2 is a cross-sectional view of a motor driven transfer case with modular actuation.

Referring now to FIGS. 1-2, the transfer case 30 can be equipped with a range shifting assembly 60, a normally disengaged clutch assembly 80, an actuating gear 48 for actuating the range shifting function of the range shifting assembly 60 and actuating the mode shifting function of the clutch assembly 80, and a clutch actuator 88. The clutch actuator 88 can be moveable between a contracted position and an expanded position and is engageable with the clutch assembly 80 for engaging the clutch assembly 80 when in the expanded position. A control system, or electronic control unit 21 can be provided for controlling actuation of a reversible electric motor 44 for driving the actuating gear 48. The control system can include at least one sensing element 23 for detecting a position of the actuating gear 48. The electronic control unit 21 can operate in an automatic mode automatically controlling the reversible electric motor 44, or can allow the driver to select one of the available drive modes and ranges in a manual mode of operation through the mode selection mechanism 25. In either case, the control system 21 can provide for control signals being sent to the transfer case 30 to cause the transfer case 30 to actuate the range shifting assembly 60 and/or the clutch assembly 80 in response to the at least one sensing element 23 and/or a detected position of the actuating gear 48.

Referring now to FIGS. 1-6, an improvement of the transfer case 30 is shown to include an input shaft 34 adapted to be driven by the power transmission device 22. A drive shaft can be rotated by the internal combustion engine 24 and can be coupled to the power transmission device 22 that converts the output power from the internal combustion engine 24 to a geared output drive power. The output drive power from the power transmission device 22 can be transmitted to the input shaft 34 of the transfer case 30. The transfer case 30 can selectively transmit output drive power to the pair of rear wheels 29 and/or the pair of front wheels 28. The transfer case 30 can include a housing 41, the range shifting assembly 60, the clutch assembly 80, and the actuating gear 48 operable to control coordinated shifting of the range shifting assembly 60 and actuation of the clutch assembly 80 between an engaged position and a disengaged position. The housing 41 can encompass the first output shaft 36 and the second output shaft 38. The housing 41 can include various seals, recesses, shoulders, flanges, bores, etc. that accept and position the various components and parts of the transfer case 30 discussed herein. The input shaft 34 can be rotably supported by the housing 41 on bearings 33 and can be supported at one end adjacent the first output shaft 36. As illustrated in FIG. 2, the first output shaft 36 can be rotably mounted within the housing 41. The input shaft 34, the first output shaft 36, and the second output shaft 38 can extend from the housing 41 of the transfer case 30. A power transmission member 40 can transfer torque from the first output shaft 36 to the second output shaft 38 (seen in FIG. 1 and not shown in FIG. 2). The power transmission member 40 can be a belt, a chain, gear train, or any other suitable method of power transmission coupling between the shafts 36, 38.

Figure 3:
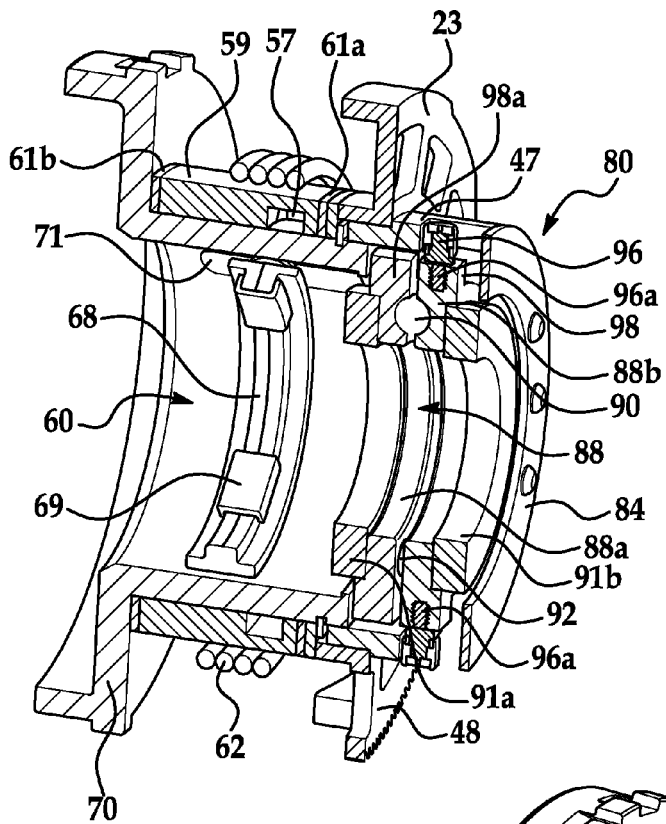
FIG. 3 is a cross-sectional view of a modular actuating device for a range shifting assembly and a clutch assembly of the transfer case of FIG. 2.
Figure 4:
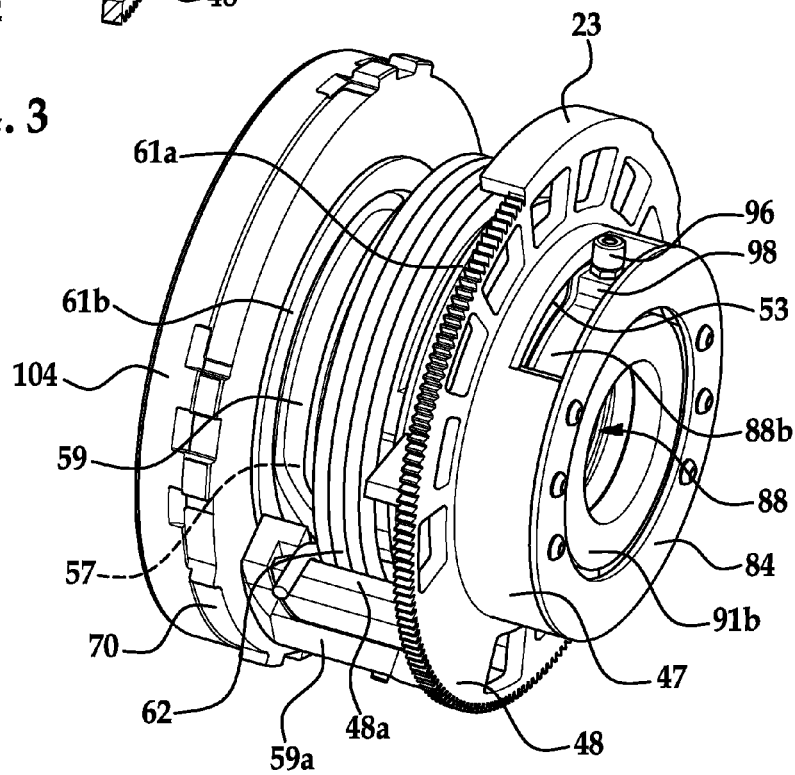
FIG. 4 is a perspective view of the modular actuating device of FIG. 3.
Figure 5:
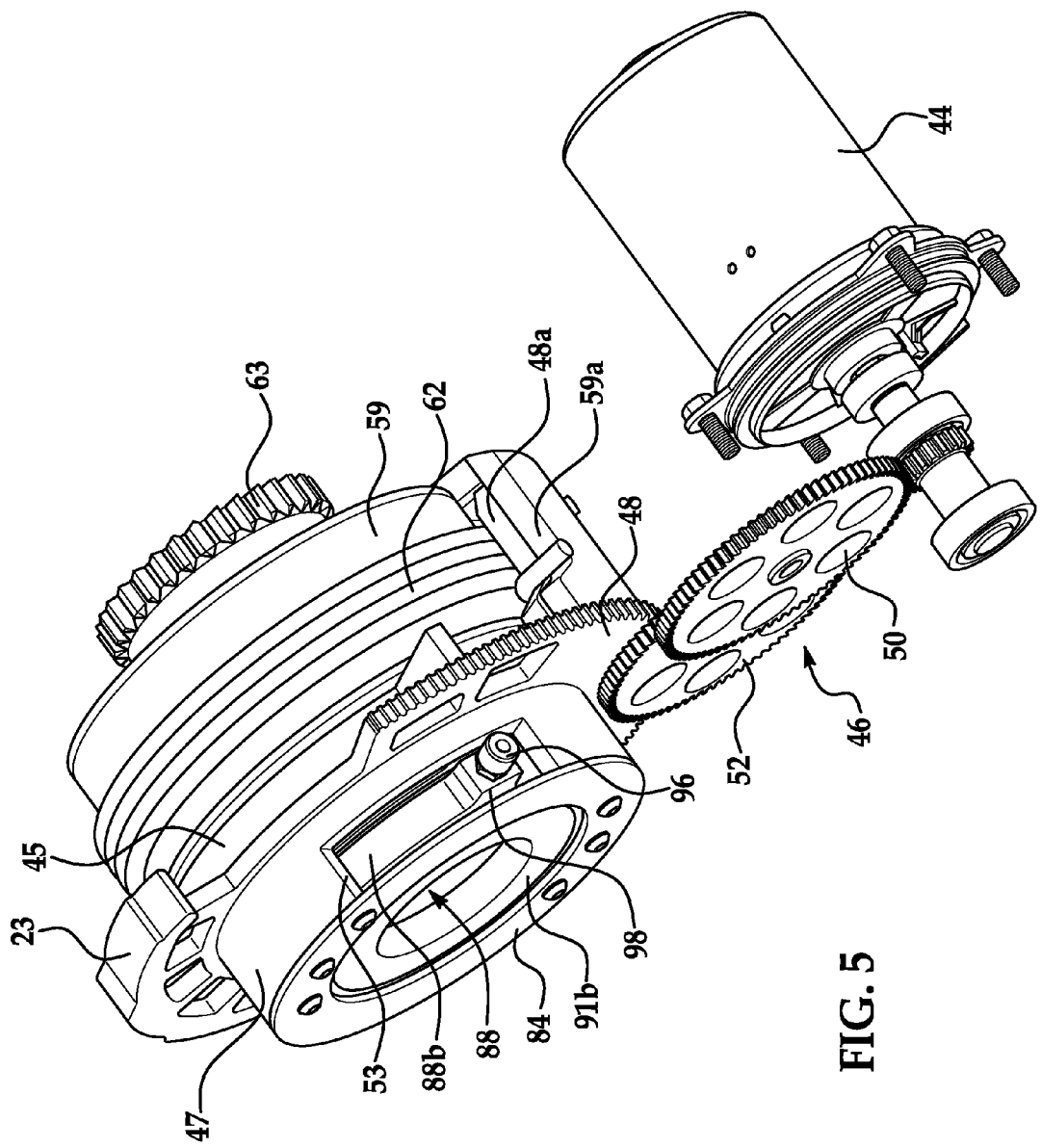
FIG. 5 is a perspective view of the modular actuating device of FIG. 3, showing a reversible electric motor and gear train for driving an actuating gear of the modular actuating device.
Figure 6:
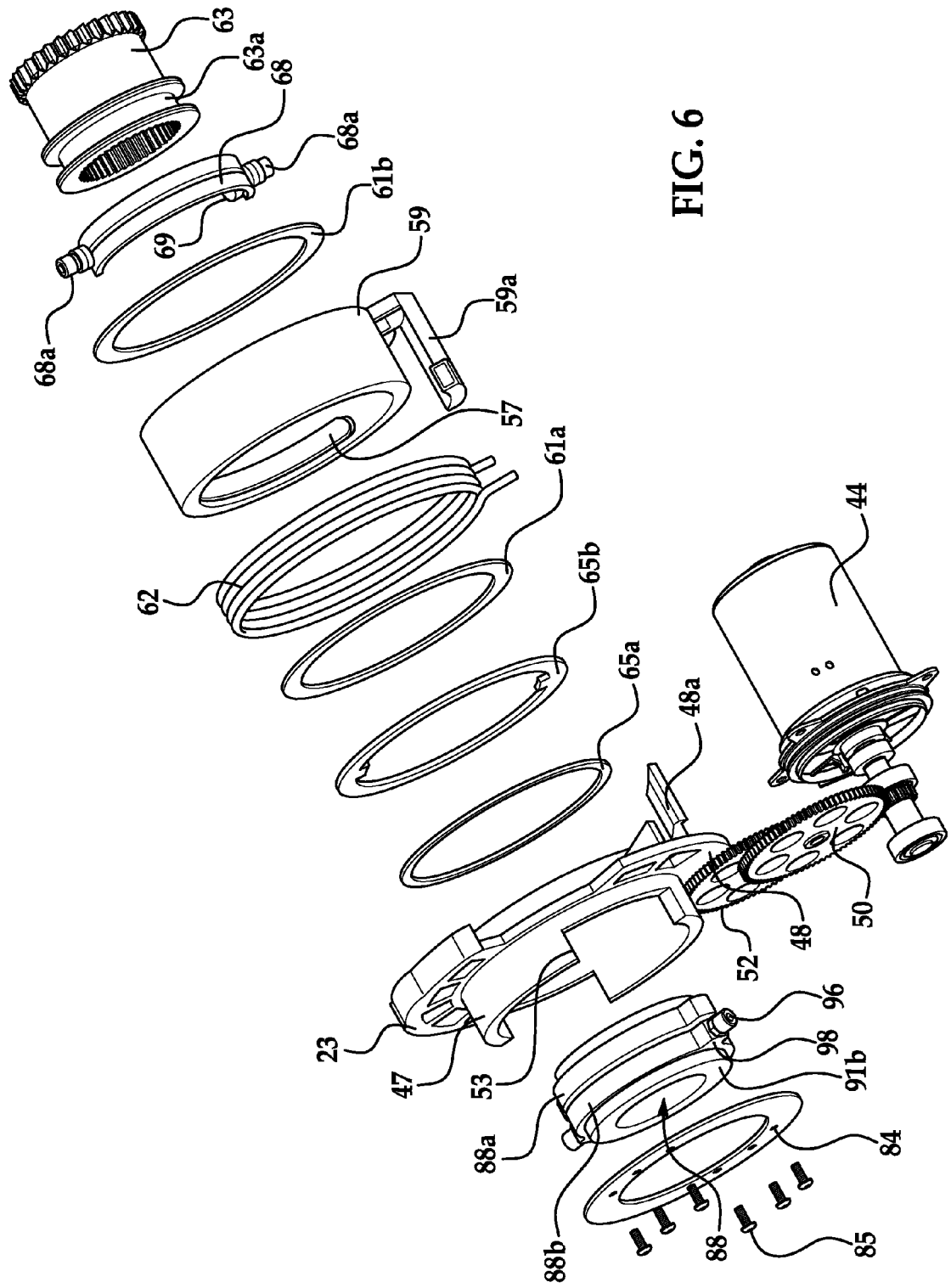
FIG. 6 is an exploded view of the modular actuating device of FIG. 3.
Figure 7:
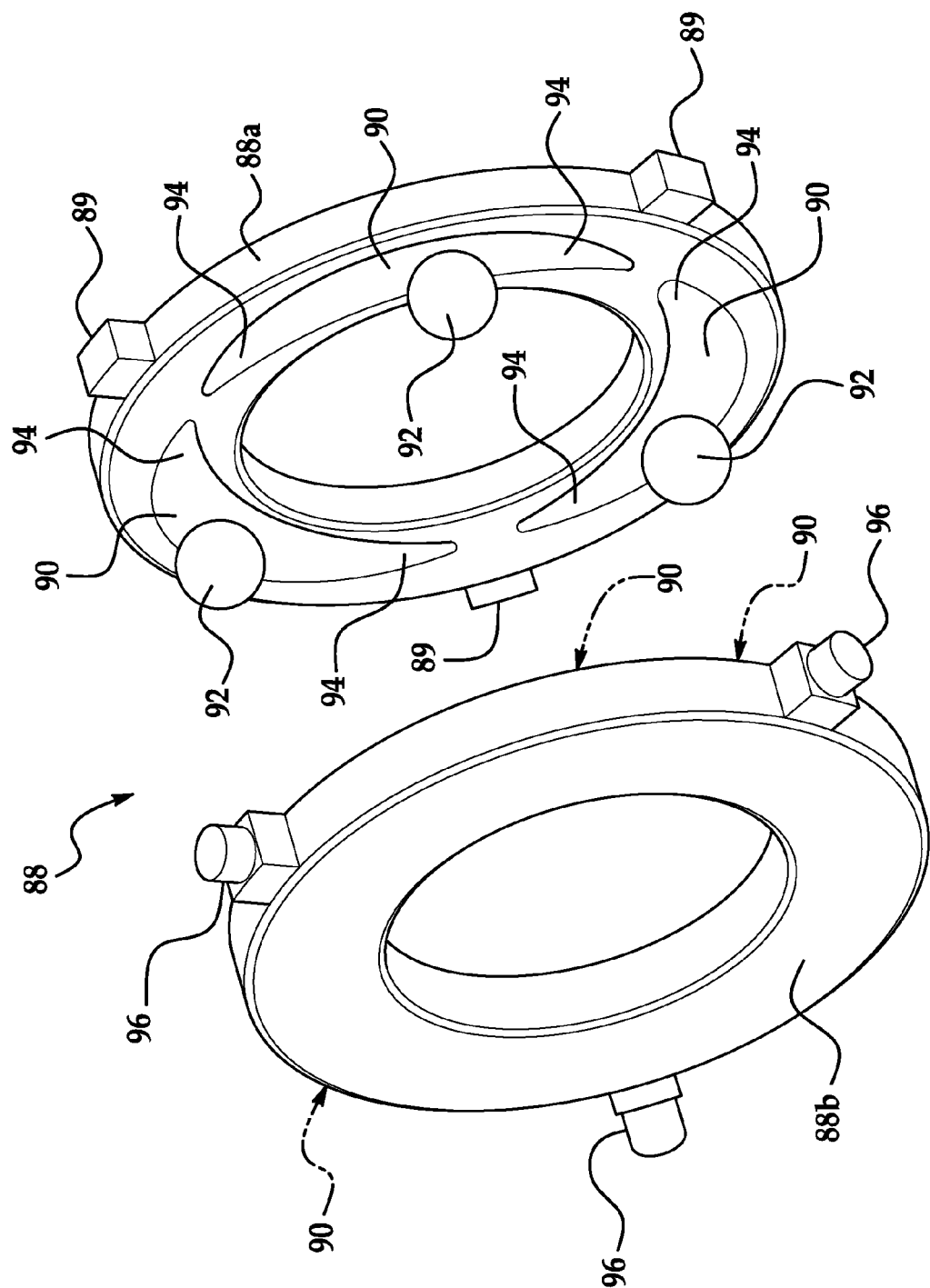
FIG. 7 is an exploded detail view of the clutch actuator of the clutch assembly of the transfer case illustrating a stationary retainer portion and a rotatable clutch actuating cam portion, each portion having elongate arcuate recesses with a deep central portion tapering to a shallow depth at outer ends for a receiving rolling member interposed between recess surfaces facing one another.

As illustrated in FIG. 2, the input shaft 34 can be rotatable with respect to a common primary axis of rotation. The range shifting assembly 60 and the clutch assembly 80 can be located along the common primary axis and positioned longitudinally adjacent to one another. This configuration provides for the use of fewer off-axis components in performing the shifting functions of the range shifting assembly 60 and the clutch assembly 80. The actuating gear 48 can be located coaxial with the common primary axis and interposed between the range shifting assembly 60 and clutch assembly 80, such that the actuating gear 48 operatively engages and operates the range shifting assembly 60 during a portion of angular rotation about the common primary axis, while the actuating gear 48 operatively actuates the clutch assembly 80 during another portion of angular rotation about the common primary axis. A reversible electric motor 44 can be located off-axis with respect to the common primary axis for driving the actuating gear 48 in rotation about the common primary axis. The actuating gear 48 can be configured for reversible rotation about the common primary axis through an angular arc of less than 360 degrees. As best illustrated in FIGS. 5-6, a gear train 46 can transfer the drive torque from the electric motor 44 to the range shifting assembly 60 and the clutch assembly 80. The gear train 46 can include a plurality of gears and can be reversibly driven by the electric motor 44. One of the plurality of gears can be the actuating gear 48 reversibly rotatable about the common primary axis and located between the range shifting assembly 60 and the clutch assembly 80. As best illustrated in FIGS. 3-6, the actuating gear 48 can operably engage a barrel cam 59 of the range shifting assembly 60 for actuating the range shifting assembly 60 during a portion of angular rotation about the primary axis. The actuating gear 48 can include an axially extending collar 47 with removed notches located opposite the range shifting assembly 60 for supporting a clutch actuation mechanism. The clutch actuator 88 can include a retainer 88a and a clutch actuating cam 88b rotatable in response to rotation of the actuating gear 48. The clutch actuating cam 88b can axially move towards the clutch assembly 80 for disengaging the clutch assembly 80 during rotation of the actuating gear 48 prior to shifting the range shifting assembly 60 between the high-range drive mode and low-range drive mode. In other words, the clutch actuating cam 88b can move to disengage the clutch assembly 80 while maintaining the range shifting assembly 60 in either the high-range drive mode or the low-range drive mode.

The actuating gear 48 can be axially located adjacent to a barrel cam 59 with a thrust bushing 61a and ring members 65a, 65b interposed between the barrel cam 59 and actuating gear 48. The barrel cam 59 can be indirectly connected for rotation in response to rotation of the actuating gear 48 through torsional wrap spring 62. As best illustrated in FIGS. 4-6, the barrel cam 59 can be interposed between thrust bushings 61a, 61b and can include a barrel tab 59a extending axially toward the actuating gear 48. The actuating gear 48 can include an actuating gear tab 48a extending axially toward the range shifting assembly 60 and radially spaced from the barrel cam 59. The actuating gear tab 48a can move angularly in either rotational direction with respect to the barrel tab 59a. The barrel tab 59a and actuating gear tab 48a can move in rotation independently with respect to one another, such that driving force is loaded into a torsional wrap spring 62 by rotational movement of the actuating gear tab 48a in either rotational direction and the rotational driving force is transferred through the torsional wrap spring 62 to the barrel tab 59a to urge rotation of the barrel cam 59 to follow the rotational direction of movement of the actuating gear 48. As best illustrated in FIGS. 3, 4, and 6, the barrel cam 59 can include a cam surface groove 57 extending circumferentially and axially along an interior surface of the barrel cam 59. An axially extending portion of the cam surface groove 57 can define an axial range shift movement in response to rotation of the barrel cam 59. Circumferentially extending portions at either end of the axially extending portion of the cam surface groove 57 can define a clutch actuation movement in response to rotation of the barrel cam 59. The range shifting assembly 60 can include the torsional wrap spring 62 extending around the outer circumference of the barrel cam 59 for biasing the barrel cam 59 to follow rotational movement of the actuating gear 48, allowing completion of range shift movement if temporarily blocked due to unmeshed gear teeth engagement during axial movement. The wrap spring 62 can hold the barrel tab 59a and the actuating gear tab 48a in radial alignment with one another after completion of rotational driving movement. The wrap spring 62 is constrained to follow movement of the actuating gear 48 and can be loaded with force in either rotational direction of the actuating gear 48. The loaded force of the torsional wrap spring 62 urges rotational movement of the barrel cam 59 to follow rotational movement of the actuating gear 48. When loaded with force, the wrap spring 62 continually biases the barrel cam 59 in the desired direction of movement until the range shift movement or clutch actuation movement is completed. A shift fork 68 can be driven to move in guided travel along the cam surface groove 57 in an axial direction in response to rotation of the barrel cam 59 by the actuating gear 48 to actuate the range shift function between a low-range drive mode and a high-range drive mode of operation. The shift fork 68 can be operably engageable with the barrel cam 59 through a shift collar 70. The barrel cam 59 can be rotatably biased toward the desired rotational movement by the wrap spring 62, even if axial movement of the shift fork is temporarily blocked, while the actuating gear 48 continues to rotate. When the barrel cam 59 is axially blocked during rotation, the wrap spring 62 can be loaded with rotational energy to bias the barrel cam 59 to move into a desired orientation when the blocked condition ceases. The wrap spring 62 can store energy between the electric motor 44 and the shift fork 68 until the desired range mode shift is completed.

As illustrated in FIGS. 3-6, the actuating gear 48 can actuate the range shifting assembly 60 through rotational movement of the actuating gear tab 48a located on a side facing the range shift assembly 60. As best illustrated in FIGS. 5-6, the gear train 46 can include the input gear 50 driven by the electric motor 44. The gear train 46 can further include the intermediate output gear 52. The gear train 46 can be reversibly driven by the reversible electric motor 44. The input gear 50 can rotate the intermediate output gear 52. The intermediate output gear 52 can rotate the actuating gear 48. The range shifting assembly 60 can include the barrel cam 59 having the cam surface groove 57 extending circumferentially and axially along an interior surface of the barrel cam 59 to define an axial range shift movement in response to rotation of the barrel cam 59. The shift fork 68 can travel along the cam surface groove 57 to shift the range shifting assembly 60 between a low-range drive mode position and a high-range drive mode position. The barrel cam 59 can be rotatable about the common primary axis through an arc of less than 360 degrees in response to rotation of the actuating gear 48 in either rotational direction. The range shifting assembly 60 can further include the shift collar 70 with an axial groove 71 allowing passage of a cam follower portion 68a of the shift fork 68 radially into engagement within the cam surface groove 57 of the barrel cam 59 for driving axial travel of the shift fork 68 in response to rotation of the barrel cam 59. The shift fork 68 can act as a cam follower traveling within the cam surface groove 57 of the barrel cam 59 as the barrel cam 59 is rotated in either rotational direction. The shift fork 68, barrel cam 59, and shift collar 70 can surround an axially moveable and rotatable internal range sleeve 63. The internal range sleeve 63 can include a groove 63a engageable with an internal ridge surface 69 of the shift fork 68, allowing rotation of the internal range sleeve 63 relative to the shift fork 68. As best illustrated in FIG. 3, the shift collar 70 is a cylindrical element supporting the shift fork 68 through the axial groove 71 allowing guided axial movement of the shift fork 68, while preventing rotational movement of the shift fork 68. The shift collar 70 allows the shift fork 68 to slide in an axial direction to drive the internal range sleeve 63 in response to shifting rotational movement of the barrel cam 59 between a low-range angular position and a high-range angular position. The shift fork 68 supports the internal range sleeve 63 for rotation and axial movement through engagement of the internal ridge surface 69 with groove 63a. The internal range sleeve 63 can be engageable between the range shifting assembly 60 and a differential assembly 72 and transfers rotation from the differential assembly 72 to the output shaft 36 through a splined connection allowing axial movement of the internal range sleeve 63 with respect to the output shaft 36. The differential assembly 72 can vary the drive power between the input shaft 34 and the output shafts 36, 38.

When the control system 21 shifts the vehicle 14 into a high-range drive mode, the control system 21 can send a control signal to the transfer case 30. The actuating gear 48 can be rotated by the electric motor 44 within the transfer case 30 to drive actuating gear tab 48a to load biasing force into torsional wrap spring 62. The barrel cam 59 can be rotated in response to biasing force applied by torsional wrap spring 62 to barrel tab 59a. In response to rotation of the barrel cam 59, the shift fork 68 is driven to travel in an axial direction following the cam surface groove 57 of the barrel cam 59. The cam surface groove 57 includes a first end portion, a second end portion, and an intermediate portion extending between the first end portion and the second end portion. The first end portion can have a predetermined circumferential arcuate length and can lie in a first plane perpendicular to the primary rotational axis. The second end portion can have a predetermined circumferential arcuate length and can lie in a second plane perpendicular to the primary rotational axis axially spaced from the first plane. The intermediate portion of the cam surface groove 57 can extend arcuately and axially between the first end portion and the second end portion to define axial shifting movement of the shift fork 68 between the low-range mode and high-range mode of operation. The first and second end portions define a period of dwell at the first end portion and the second end portion of the cam surface groove 57 of the barrel cam 59. Each end portion of the cam surface groove 57 can allow actuation of the clutch actuator 88 prior to beginning axial shifting movement of the shift fork 68, such that the shift fork 68 can remain axially stationary at each end portion of the cam surface groove 57 while the clutch actuator 88 is operated between the contracted position and the expanded position. The shift fork 68 axially slides the internal range sleeve 63 of the range shifting assembly 60 between the high-range drive mode position, a neutral position, and a low-range drive mode position. When the shift fork 68 moves into the period of dwell at the first end of the barrel cam 59, the shift fork 68 remains axially stationary within the axial groove 71 formed in the shift collar 70 while sliding peripherally within the barrel cam groove 57 to actuate the clutch actuator 88. When the shift fork 68 leaves a period of dwell at the first end of the barrel cam 59, the shift fork 68 moves axially from a first position toward a second position located axially away from the actuating gear 48 in a direction toward the input shaft 34.

The period of dwell at the first end of the barrel cam 59 can define the high-range drive mode and first actuation region of the clutch actuator 88. In the high-range drive mode, the first output shaft 36 can rotate at a uniform speed with the input shaft 34. The input shaft 34 and the first output shaft 36 can rotate at a one to one (1:1) ratio. As best illustrated in FIG. 2, the range shifting assembly 60 can include a differential assembly 72 allowing for shifting between the low-range drive mode, a neutral position, and a high-range drive mode. When the control system 21 shifts the vehicle 14 into the low-range drive mode, the barrel cam 59 can be rotated by the actuating gear 48, such that the shift fork 68 moves toward and enters within the period of dwell located at the second end of the barrel cam 59 defining the low-range mode of operation and a second actuation region of the clutch actuator 88. When the shift fork 68 moves toward the low-range mode of operation portion of the cam surface groove 57, the shift fork 68 slides along the axial groove 71 formed in the shift collar 70 driving the internal range sleeve 63 into engagement with a planetary gear carrier 106 of the differential assembly 72 to provide a drive ratio of less than one to one. When the range shifting assembly 60 is in the low-range drive mode, the input shaft 34 can provide a different drive ratio to the first output shaft 36 and the second output shaft 38. When in the high-range mode of operation, the barrel cam 59 slides the shift fork 68 along the axial groove 71 formed in the shift collar 70 to drive the internal range sleeve 63 for engagement with a sun gear 108 of the differential assembly 72 for a direct drive configuration.

As best illustrated in FIG. 1, the differential assembly 72 can include a planetary gear assembly. The planetary gear assembly can include a plurality of planetary gears 102 supported by a planetary gear carrier 106 in meshing engagement with a ring gear 104 and a sun gear 108. When the shift fork 68 is driven into a low-range drive mode portion of the cam surface groove 57, the internal range sleeve 63 can axially move to couple the output shaft 36 with the planetary gear carrier 106. When the shift fork 68 is driven into the high-range drive mode portion of the cam surface groove 57, the internal range sleeve 63 can axially move to couple the output shaft 36 with the sun gear 108. The gear teeth of the internal range sleeve 63 can engage with the internal teeth of the sun gear 108. The sun gear 108 can be driven by the input shaft 34. The plurality of planetary gears 102 can be rotatable around the sun gear 108. A planetary gear assembly 74 can include the planetary gear carrier 106. Drive torque can be transferred to the output shaft 36 directly from the sun gear 108 or indirectly through the planetary gear carrier 106 depending on the drive ratio desired. The gearing ratio between the sun gear 108 and the plurality of planetary gears 102 can be a reduction ratio, rotating the first output shaft 36 at a different speed in comparison to the rotation speed of the input shaft 34. The reduction ratio can be in a range of between approximately 3:1 to approximately 10:1, inclusive, with a preferred ratio of approximately 6:1. It should be recognized by those skilled in the art, that other differential assembly designs other than the one illustrated can be employed in the transfer case 30 without departing from the spirit or scope of the present invention. Any range shifting assembly 60 having an axially movable member driven by a concentric gear coaxially interposed between the range shifting assembly 60 and clutch assembly 80 through a barrel cam to establish first and second drive ratio connections and including the clutch actuator 88 to actuate the clutch assembly 80 is considered to be within the scope of the present invention.

The actuating gear 48 can also engage the clutch assembly 80 through a face opposite from the range shifting assembly 60. As best illustrated in FIGS. 5-6, the gear train 46 can include an input gear 50 driven by the reversible electric motor 44 within the transfer case 30. The gear train 46 can further include an intermediate output gear 52. The input gear 50 can rotate the intermediate output gear 52 which can engage the input gear 50 and the actuating gear 48. The intermediate output gear 52 can reversible rotate the actuating gear 48 through an angular arc of less than 360 degrees. A clutch actuator 88 can be moved between an axially expanded position and an axially contracted position in response to rotation of the actuating gear 48. As best seen in FIGS. 2-7, the clutch actuator 88 can include a retainer 88a and a clutch actuating cam 88b that can be rotatable in response to rotation of the actuating gear 48. The retainer 88a can include tabs 89 to be coupled to the shift collar 70 within complementary recesses for preventing rotation with respect to the actuating gear 48. The clutch actuating cam 88b can be driven in rotation by the actuating gear 48 in response to interaction between the pins 96 with the notched portions 53 of the collar 47 for driving the clutch actuating cam 88b axially towards the clutch assembly 80 for engaging the clutch assembly 80. The clutch actuating cam 88b can be driven axially in response to the rolling members 92 movement relative to inclined ramp portions adjacent outer ends 94 of each elongated arcuate recesses 90 formed in the surfaces facing one another between the clutch actuating cam 88b and retainer 88a.

The cam surface groove 57 of the barrel cam 59 can include a period of dwell on either end of the axial travel of the shift fork 68 within the cam surface groove 57. When the shift fork 68 is in the period of dwell during one of the high-range drive mode and the low-range drive mode, the shift fork 68, acting as a cam follower, is axially stationary while the actuating gear 48 can be rotated. The clutch actuating cam 88b can be rotated with respect to the retainer 88a in response to rotation of the actuating gear 48 toward the axially expanded position allowing engagement of the clutch assembly 80. When the shift fork 68 is in the range shift portion of the cam surface groove 57, the clutch assembly 80 can be disengaged. The actuating gear 48 can be reversibly rotated and a clutch return spring can be provided to urge the clutch actuating cam 88b toward the axially contracted position in response to reverse rotation of the actuating gear 48 from the clutch engaged position.

When the shift fork 68 is in the range shift portion of the cam surface groove 57 and rotation of the barrel cam 59 is blocked due to axial movement of the internal range sleeve 63 being blocked until proper intermeshing teeth alignment is achieved to complete the requested range mode shift, the wrap spring 62 can act to receive the load allowing the actuating gear 48 to continue to rotate. When the actuating gear 48 is rotated by the reversible electric motor 44, the clutch actuating cam 88b can be rotated by the actuating gear 48 relative to the stationary retainer 88a. The retainer 88a can be located coaxial with respect to the clutch actuating cam 88b and axially adjacent to the clutch actuating cam 88b. The retainer 88a can be supported by tabs 89 engaged within complementary recesses formed in the shift collar 70 for preventing rotation with respect to the actuating gear 48. The retainer 88a and clutch actuating cam 88b can define a plurality of elongate arcuate recesses 90, where each recess has a deep central portion tapering to a shallow depth at outer ends 94. The plurality of elongate arcuate recesses 90 can receive a corresponding plurality of rolling members 92 with one rolling member 92 per recess 90. The clutch actuating cam 88*b* can be positioned to trap the plurality of rolling members 92 interposed between the retainer 88*a* and the clutch actuating cam 88*b*. The plurality of rolling members 92 can be located within corresponding elongated arcuate recesses for operable engagement with the clutch actuating cam 88*b*. The clutch actuating cam 88*b* can be angularly rotatable with respect to the retainer 88*a* in response to rotation of the actuating gear 48. As best illustrated in FIG. 3, the clutch actuating cam 88*b* can include a plurality of pins 96 supported on a surface 98 of the clutch actuating cam 88*b* for imparting angular rotation to the clutch actuating cam 88*b* with respect to the retainer 88*a* through the actuating gear 48 by interaction with the cutout notches 53 formed in the collar 47. The plurality of pins 96 can allow axial movement of the clutch actuating cam 88*b* with respect to the retainer 88*a* while providing a free floating movement between the clutch actuating cam 88*b* and the actuating gear 48. The plurality of pins 96 can be screwed to the surface 98 via screws 96*a*. As illustrated in FIG. 3, the retainer 88*a* can also include a surface 98*a* adjacent the surface 98 of the clutch actuating cam 88*b*. The surface 98*a* of the retainer 88*a* can be supported by the shift collar 70 through tabs 89 engaged within corresponding recesses formed in the shift collar 70. The axially extending collar 47 of the actuating gear 48 can define at least one arcuate notch 53. The at least one arcuate notch 53 can correspond in number to the plurality of pins 96 with one arcuate notch 53 receiving one corresponding pin 96 for allowing angular driven rotation and corresponding axial movement of the clutch actuating cam 88*b* in response to angular rotation of the actuating gear 48. The pin 96 can be engageable within the arcuate notch 53 to provide a free floating movement between the clutch actuating cam 88*b* and the actuating gear 48. As best illustrated in FIGS. 3-4 and 6, a retaining plate 84 can engage with the axially extending collar 47 of the actuating gear 48 for enclosing the retainer 88*a* and the clutch actuating cam 88*b* and limiting axial travel of the clutch actuating cam 88*b*. The retaining plate 84 can be connected to the axially extending collar 47 of the actuating gear 48 with a plurality of bolts 85.

The clutch actuating cam 88*b* can be axially moveable along the common primary axis towards the clutch assembly 80 in response to movement of the rolling member 92 along the corresponding elongated arcuate recess toward one of the tapered outer ends causing a distance between the retainer 88*a* and the clutch actuating cam 88*b* to increase. In response to rotational movement of the actuating gear 48, each of the plurality of rolling members 92 slide or roll to an outer shallower end portion of the corresponding elongated arcuate recess 90 causing axial movement of the clutch actuating cam 88*b* away from the retainer 88*a* and toward the clutch assembly 80. Depending on the clutch assembly design, the clutch actuating cam 88*b* can operate to drive an apply plate 83 between first and second axial positions to apply and engage the clutch as the rolling members 92 move between the deeper central portion of the recesses 90 and the outer tapering shallower end portions of the recesses 90. When the range shifting assembly 60 is in either the low-range drive mode or a high-range drive mode and it is desired that the clutch assembly 80 is engaged, the reversible electric motor 44 can drive the actuating gear 48 to rotate the retainer 88*a* in the either direction allowing the plurality of rolling members 92 to move from the deeper central portion of the retainer 88*a* toward one of the shallower end portions 94 of the recess 90. A biasing member located in the clutch assembly 80, such as a spring or hydraulic force, can bias the clutch assembly 80 against the apply plate 83 to force the actuating cam 88*b* back towards the retainer 88*a* allowing disengagement of the clutch assembly 80 during range shifting.

The clutch assembly 80 can be disengaged prior to shifting of the range shifting assembly 60 between the high-range drive mode and the low-range drive mode to prevent transfer of rotational torque through the clutch assembly 80 to the secondary output shaft 38, essentially providing capability for two-wheel drive mode and four wheel drive mode in either the high-range drive mode or the low-range drive mode if desired. In other words, the clutch assembly 80 can be disengaged when the range shifting assembly 60 is in the high-range drive mode or the low-range mode to establish a two-wheel drive mode. The transfer case 30 can include at least one sensing element 23 and an engine control unit 21 for detecting a position of the actuating gear 48 and for controlling shifting of the vehicle between the high-range drive mode and the low-range drive mode, or shifting the vehicle between the two-wheel drive mode and the all-wheel drive mode. The sensing element 23 can be located on a peripheral surface of the actuating gear 48 and can be mechanical or electrical. The engine control unit 21 can automatically signal the reversible motor to drive the actuating gear 48 in response to a detected position of the actuating gear 48 by the at least one sensing element 23 for actuating movement of at least one of the range shifting assembly 60 and/or the clutch assembly 80 of the vehicle. When the range shifting assembly 60 is in one of the high-range drive mode and the low-range drive mode, the actuating gear 48 can be rotated to actuate the clutch actuating cam 88*b* and engage the clutch assembly 80, establishing a two-wheel drive mode during either the high-range drive mode or the low-range drive mode, if further rotation of the actuating gear 48 is stopped with the shift fork 68 still positioned within one of the dwell regions of the cam surface groove 57 of the barrel cam 59. During the high-range drive mode or the low-range drive mode and after actuation of the clutch assembly 80, the barrel cam 59 can be further rotated, in response to further rotation of the actuating gear 48, causing the shift fork 68 to travel beyond the corresponding one of the dwell regions of the cam surface groove 57 of the barrel cam to begin actuation of the range shifting assembly 60. In other words, the shift fork 68 can be maintained axially stationary during actuation of the clutch assembly 80 while the cam follower portion of the shift fork 68 is engaged with one of the dwell regions of the cam surface groove 57 of the barrel cam 59.

As best illustrated in FIGS. 2-3, the clutch assembly 80 can further include the apply plate 83, a plurality of clutch discs 86, a clutch housing 81, a drive gear 82, and wear pads 91*a*, 91*b*. When the clutch assembly 80 is engaged to establish an all-wheel drive mode, the drive gear 82 can be rotatable with respect to the primary axis and can drive the second output shaft 38 through the power transmission member 40. The apply plate 83 can be axially driven by the clutch actuating cam 88*b* to engage the plurality of clutch discs 86 located along the common primary axis. The apply plate 83 can be axially moveable between a first clutch position and a second clutch position. When the actuating gear 48 is stationary and the plurality of rolling members 92 are located within the deeper central portion of the recesses 90 of the retainer 88*a* and clutch actuating cam 88*b*, the apply plate 83 can be located in a first position axially away from the plurality of clutch discs 86 wherein the clutch assembly 80 is disengaged preventing drive torque from being transferred through the clutch assembly 80 to the second output shaft 38. When the actuating gear 48 is rotated and the plurality of rolling members 92 are rotated to one of the elevated shallower outer end portion of the tapering recesses 90 to axially move the clutch actuating cam 88*b* towards the clutch assembly 80, the clutch actuating cam 88*b* axially exerts force on the apply plate 83 to move the apply plate 83 to the second clutch position to engage the plurality of clutch discs 86 such that drive torque is transferred through the clutch assembly 80. In the second position, a maximum clutch engagement force can be applied to the clutch assembly 80 such that the first output shaft 36 is coupled for uniform rotation with the second output shaft 38 to establish a non-differentiated drive mode. It should be recognized by those skilled in the art, that variations in assembling a multiple plate clutch assembly including clutch friction discs are contemplated to be within the spirit and scope of the present invention. Any clutch actuator assembly having an axially movable apply plate driven axially by a concentric gear interposed coaxially between the range shifting assembly 60 and clutch assembly 80 through the clutch actuator 88 to establish power transmission between first and second output shafts 36, 38 is considered to be within the scope of the present invention.

A transfer case 30 can be assembled to include an input shaft 34 having a primary axis of rotation, a first output shaft 36 coaxially aligned with and rotatable about the primary axis, a second output shaft 38 rotatable about a secondary axis parallel to the primary axis, and a power transmission device 40 located between the first output shaft 36 and the second output shaft 38. The method can include positioning a range shifting assembly 60 coaxial with respect to the primary axis and positioning a clutch assembly 80 coaxial and axially adjacent the range shifting assembly 60. The range shifting assembly 60 can be operably connected between the input shaft 34 and the first output shaft 36 to axially shift between a low-range drive mode and a high-range drive mode. The clutch assembly 80 can be operably connected to the power transmission device 40 to axially move between an engaged position and a disengaged position to transfer into and out of a state creating driving continuity for transferring drive torque between the first output shaft 36 and the second output shaft 38. The method can further include interposing an actuating gear 48 axially between the range shifting assembly 60 and the clutch assembly 80 for rotation with respect to the primary axis through an angular arc of less than 360 degrees. The actuating gear 48 can be rotatable with respect to the primary axis through an angular arc of less than 360 degrees for shifting the range shifting assembly 60 between the low-range drive mode and the high-range mode and for actuating the clutch assembly 80 between the disengaged position and the engaged position. The method can further include positioning a clutch actuating cam 88*b* rotatable in response to rotation of the actuating gear 48 and axially moveable towards the clutch assembly 80 for engaging the clutch assembly 80.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a transfer case (30) of a motor vehicle including an input shaft (34) having a primary axis of rotation, a first output shaft (36), a second output shaft (38), and a power transmission device (40) located between the first output shaft (36) and the second output shaft (38), the improvement comprising:
    a range shifting assembly (60) connected between the input shaft (34) and the first output shaft (36) for shifting between a low-range drive mode and a high-range drive mode of operation;
    a normally disengaged clutch assembly (80) connected to the power transmission device (40) and moveable between an engaged position and a disengaged position to transfer into and out of a state creating driving continuity for transferring drive torque between the first output shaft (36) and the second output shaft (38);
    a clutch actuator (88) moveable between an expanded position and a contracted position and engageable with the clutch assembly (80) for engaging the clutch assembly (80) when in the expanded position; and
    an actuating gear (48) reversibly rotatable through a predetermined angular arc of movement for operating the clutch actuator (88) between the contracted position and the expanded position for actuating the clutch assembly (80) between the disengaged position and the engaged position, and for shifting the range shifting assembly (60) between the low-range drive mode and the high-range drive mode when the clutch assembly (80) is in the disengaged position.

2. The improvement of claim 1, wherein the clutch actuator (88) further comprises:
    a clutch actuating cam (88*b*);
    a retainer (88*a*) supported for preventing rotation with the actuating gear (48) and axially interposed between the range shifting assembly (60) and the clutch actuating cam (88*b*), the retainer (88*a*) defining a plurality of elongated arcuate recesses (90) having a deep central portion tapering to a shallow depth at outer ends (94); and
    a corresponding plurality of rolling members (92), said rolling member (92) received within each of the plurality of elongated arcuate recesses (90) for movement along the elongated arcuate recess (90) between the deep central portion of the recess (90) and the shallow depth at the outer ends (94) of each recess (90), the clutch actuating cam (88*b*) trapping the plurality of rolling members (92) interposed between the retainer (88*a*) and the clutch actuating cam (88*b*), the clutch actuating cam (88*b*) angularly rotatable with respect to the retainer (88*a*) and axially moveable toward the clutch assembly (80) for engaging the clutch assembly (80) in response to movement of the rolling member (92) from the deep central portion of the recess (90) to the shallow depth at the outer ends (94) of the recess (90).

3. The improvement of claim 2, wherein the clutch actuator further comprises:
    at least one pin (96) supported on a surface (98) of the clutch actuating cam (88*b*) for imparting angular rotation to the clutch actuating cam (88*b*) with respect to the retainer (88*a*) through the actuating gear (48), while allowing axial movement of the clutch actuating cam (88*b*) with respect to the retainer (88*a*) providing a free floating movement between the clutch actuating cam (88*b*) and the actuating gear (48).

4. The improvement of claim 3, wherein the actuating gear (48) further comprises:

an axially extending collar portion (47) of the actuating gear (48) defining at least one arcuate notch (53), the at least one arcuate notch (53) corresponding in number to the at least one pin (96), the at least one arcuate notch (53) receiving the at least one pin (96) for allowing angular driven rotation and corresponding axial movement of the clutch actuating cam (88b) in response to angular rotation of the actuating gear (48).

5. The improvement of claim 4, wherein the actuating gear (48) further comprises:
a retaining plate (84) engageable with the axially extending collar portion (47) of the actuating gear (48) for enclosing the retainer (88a) and the clutch actuating cam (88b) and for limiting axial travel of the clutch actuating cam (88b).

6. The improvement of claim 1, wherein the range shifting assembly (60) further comprises:
a barrel cam (59) connected for rotation in response to rotation of the actuating gear (48) and including a cam surface groove (57) having a first end portion, a second end portion, and an intermediate portion extending between the first end portion and the second end portion;
a torsion wrap spring (62) engageable between the barrel cam (59) and the actuating gear (48) for biasing the barrel cam (59) to follow reversible rotational movement of the actuating gear (48);
a shift fork (68) for guided travel along the cam surface groove (57) of the barrel cam (59) in response to rotation of the barrel cam (59) by the actuating gear (48) to shift between the low-range drive mode and the high-range drive mode;
a shift collar (70) defining an axial groove (71) and for supporting the shift fork (68) to allow axial movement of the shift fork (68) while restricting rotation of the shift fork (68); and
an internal range sleeve (63) supported for rotation with respect to the shift fork (68) while being driven in axial movement in response to axial movement of the shift fork (68) with respect to the shift collar (70) in response to rotation of the barrel cam (59) with respect to the shift collar (70), the internal range sleeve (63) connected for driving rotation of the first output shaft (36).

7. The improvement of claim 6, wherein the cam surface groove (57) includes the first end portion having a predetermined circumferential arcuate length lying in a first plane perpendicular to the primary rotational axis, the second end portion having a predetermined circumferential arcuate length lying in a second plane perpendicular to the primary rotational axis and axially spaced from the first plane, and the intermediate portion of the cam surface groove (57) extending arcuately and axially between the first end portion and the second end portion to define axial shifting movement of the shift fork (68) between the low-range drive mode and the high-range drive mode of operation, while the first and second end portions define a period of dwell at the first end portion and the second end portion of the cam surface groove (57) of the barrel cam (59), each end portion of the cam surface groove (57) allowing actuation of the clutch actuator (88) prior to beginning axial shifting movement of the shift fork (68), such that the shift fork (68) remains axially stationary at each end portion of the cam surface groove (57) while the clutch actuator (88) is operated between the contracted position and the expanded position.

8. The improvement of claim 1 further comprising:
at least one sensing element (23) located on a peripheral surface of the actuating gear (48) for detecting a position of the actuating gear (48); and
an engine control unit (21) for actuating the range shifting assembly (40) and the clutch assembly (80) in response to a detected position of the actuating gear (48) by the at least one sensing element (23).

9. The improvement of claim 1 further comprising:
a reversible electric motor (44) located off axis with respect to the primary axis of rotation; and
a gear train (46) reversibly driven by the electric motor (44) for driving the actuating gear (48) in rotation.

10. A transfer case (30) comprising:
an input shaft (34) having a primary axis of rotation;
a first output shaft (36) aligned coaxially with respect to the input shaft (34) and rotatable about the primary axis;
a second output shaft (38) rotatable about a secondary axis parallel to the primary axis;
a range shifting assembly (60) operably connected between the input shaft (34) and the first output shaft (36) to axially shift between a low-range drive mode and a high-range drive mode of operation, the range shifting assembly (60) located coaxial with respect to the primary axis of rotation, the range shifting assembly (60) including an internal range sleeve (63) operably driven in axial movement along the first output shaft (36) between a first axial position and a second axial position, the range shifting assembly (60) including a differential assembly (72) operably engageable with the internal range sleeve (63) of the range shifting assembly (60) for providing different drive ratios between the input shaft (34) and the output shafts (36, 38), the differential assembly (72) including a planetary gear assembly having a plurality of planetary gears (102) supported by a planetary gear carrier (106) for meshing engagement between a ring gear (104) and a sun gear (108), the sun gear (108) driven by the input shaft (34), the first output shaft (36) selectively driven by one of the planetary gear carrier (106) and the sun gear (108) depending on an axial position of the internal range sleeve (63) in response to actuation of the range shifting assembly (60);
a clutch assembly (80) located coaxial and axially adjacent the range shifting assembly (60), the clutch assembly (80) connected to a power transmission device (40) to axially move between an engaged position and a disengaged position to transfer into and out of a state creating driving continuity for transferring drive torque between the first output shaft (36) and the second output shaft (38);
an actuating gear (48) mounted coaxial with respect to the primary axis and axially interposed between the range shifting assembly (60) and the clutch assembly (80), the actuating gear (48) rotatable through at least a predetermined angular arc with respect to the primary axis for actuating the clutch assembly (80) and for shifting the range shifting assembly (60) between the low-range drive mode and the high-range mode when the clutch assembly is in the disengaged position;
a clutch actuating cam (88b) rotatable in response to rotation of the actuating gear (48) and axially moveable towards the clutch assembly (80) for engaging the clutch assembly (80); and
a reversible electric motor (44) located off axis with respect to the primary axis for driving the actuating gear (48) in rotation.

11. The transfer case (30) of claim 10 further comprising:
a retainer (88*a*) supported for preventing rotation with respect to the actuating gear (48) and axially interposed between the range shifting assembly (60) and the clutch actuating cam (88*b*), the retainer (88*a*) defining a plurality of elongated arcuate recesses (90) having a deep central portion tapering to a shallow depth at outer ends (94);
a corresponding plurality of rolling members (92), one rolling member (92) received within each of the plurality of elongated arcuate recesses (90) for movement along the elongated arcuate recess (90) between the deep central portion of the recess (90) and the shallow depth at outer ends (94) of the recess (90), the clutch actuating cam (88*b*) trapping the plurality of rolling members (92) interposed between the retainer (88*a*) and the clutch actuating cam (88*b*), the clutch actuating cam (88*b*) angularly rotatable with respect to the retainer (88*a*) and axially moveable toward the clutch assembly (80) for engaging the clutch assembly (80) in response to movement of the rolling member (92) from the deeper central portion of the recess (90) to the shallower outer ends (94) of the recess (90); and
a plurality of pins (96) located on a surface (98) of the clutch actuating cam (88*b*) for imparting angular rotation to the clutch actuating cam (88*b*) with respect to the retainer (88*a*) through the actuating gear (48), while allowing axial movement of the clutch actuating cam (88*b*) with respect to the retainer (88*a*) providing a free floating movement between the clutch actuating cam (88*b*) and the actuating gear (48).

12. The transfer case (30) of claim 11, wherein the actuating gear (48) further comprises:
an axially extending collar (47) of the actuating gear (48) located opposite from the range shifting assembly (60) and defining a plurality of arcuate notches (53) in the actuating gear (48), the plurality of arcuate notches (53) corresponding to the plurality of pins (96), each of the plurality of arcuate notches (53) receiving one of the plurality of pins (96) for allowing angular rotation and axial movement of the clutch actuating cam (88*b*).

13. The transfer case (30) of claim 12, wherein the range shifting assembly (40) further comprises:
a barrel cam (59) connected for rotation with respect to the actuating gear (48) and including a cam surface groove (57) having a first end portion, a second end portion, and an intermediate portion extending between the first end portion and the second end portion;
a torsion wrap spring (62) engageable between the barrel cam (59) and the actuating gear (48) for biasing the barrel cam (59) to follow reversible rotational movement of the actuating gear (48);
a shift fork (68) for guided travel along the cam surface groove (57) of the barrel cam (59) in response to rotation of the barrel cam (59) by the actuating gear (48) to shift between the low-range drive mode and the high-range drive mode;
a shift collar (70) defining an axial groove (71) and for supporting the shift fork (68) to allow axial movement of the shift fork (68) while restricting rotation of the shift fork (68); and
an internal range sleeve (63) supported for rotation with respect to the shift fork (68) while being driven in axial movement in response to axial movement of the shift fork (68) with respect to the shift collar (70) in response to rotation of the barrel cam (59) with respect to the shift collar (70), the internal range sleeve (63) connected for driving rotation of the first output shaft (36).

14. The transfer case (30) of claim 13, wherein the cam surface groove (57) includes the first end portion having a predetermined circumferential arcuate length lying in a first plane perpendicular to the primary rotational axis, the second end portion having a predetermined circumferential arcuate length lying in a second plane perpendicular to the primary rotational axis and axially spaced with respect to the first plane, and the intermediate portion of the cam surface groove (57) extending arcuately and axially between the first end portion and the second end portion to define axial shifting movement of the shift fork (68) between the low-range drive mode and the high-range drive mode of operation, while the first and second end portions define a period of dwell at the first end portion and the second end portion of the cam surface groove (57) of the barrel cam (59), each end portion of the cam surface groove (57) allowing actuation of the clutch actuator (88) prior to beginning axial shifting movement of the shift fork (68), such that the shift fork (68) remains axially stationary at each end portion of the cam surface groove (57) while the clutch actuator (88) is operated between the contracted position and the expanded position.

15. A method for assembling a transfer case (30) including an input shaft (34) having a primary axis of rotation, a first output shaft (36), a second output shaft (38), and a power transmission device (40) located between the first output shaft (36) and the second output shaft (38), the method comprising:
providing a range shifting assembly (60) to be connected between the input shaft (34) and the first output shaft (36) for shifting between a low-range drive mode and a high-range drive mode of operation;
positioning a clutch actuator (88) for engagement with a normally engaged clutch assembly (80) to be connected to the power transmission device (40), the clutch assembly (80) moveable between an engaged position and a disengaged position to transfer into and out of a state creating driving continuity for transferring drive torque between the first output shaft (36) and the second output shaft (38), the clutch actuator (88) moveable between an expanded position and a contracted position and engageable with the clutch assembly (80) for engaging the clutch assembly (80) when in the expanded position; and
connecting an actuating gear (48) interposed between the range shift assembly and the clutch actuator for reversible rotation through a predetermined angular arc of movement for operating the clutch actuator (88) between the contracted position and the expanded position to actuate the clutch assembly (80) between the disengaged position and the engaged position, and for shifting the range shifting assembly (60) between the low-range drive mode and the high-range drive mode when the clutch assembly (80) is in the disengaged position.

* * * * *